United States Patent

[11] 3,534,838

| [72] | Inventor | John T. Rauen<br>Detroit, Michigan |
|---|---|---|
| [21] | Appl. No. | 838,006 |
| [22] | Filed | June 16, 1969<br>Continuation of Ser. No. 651,105,<br>June 30, 1967, now abandoned.<br>This application June 16, 1969, Ser. No.<br>838,006 |
| [45] | Patented | Oct. 20, 1970 |
| [73] | Assignee | the United States of America as represented by the Secretary of the Army |

[54] TORQUE LIMITING DEVICE
4 Claims, 6 Drawing Figs.

[52] U.S. Cl. ..................................................... 192/56, 192/84
[51] Int. Cl. ..................................................... F16d 7/06, F16d 27/01
[50] Field of Search ......................................... 192/56, 84(PM)

[56] References Cited
UNITED STATES PATENTS

| 800,564 | 10/1905 | Gibson | 192/93 |
| 1,919,437 | 7/1933 | Le Fevre | 192/56 |
| 1,953,182 | 4/1934 | Lyon | 192/56 |
| 2,050,910 | 8/1936 | Zancan | 192/56 |
| 2,730,212 | 1/1956 | Rice et al. | 192/56X |
| 2,741,352 | 4/1956 | Stevens et al. | 192/56 |
| 2,856,046 | 10/1958 | Bofinger | 192/56 |
| 2,881,891 | 4/1959 | Birkland et al. | 192/56 |
| 3,166,170 | 1/1965 | Forster et al. | 192/56X |

FOREIGN PATENTS

| 526,396 | 2/1954 | Belgium | 192/84(PM) |

Primary Examiner—Martin P. Schwadron
Assistant Examiner—Leslie J. Payne
Attorneys—Edward J. Kelly, Harry M. Saragovitz, Herbert Berl and Maxwell V. Wallace ABSTRACT: Apparatus for limiting the amount of torque that can be transmitted by a given capacity drive shaft of a power transmitting train.

Patented Oct. 20, 1970
3,534,838
Sheet 1 of 2
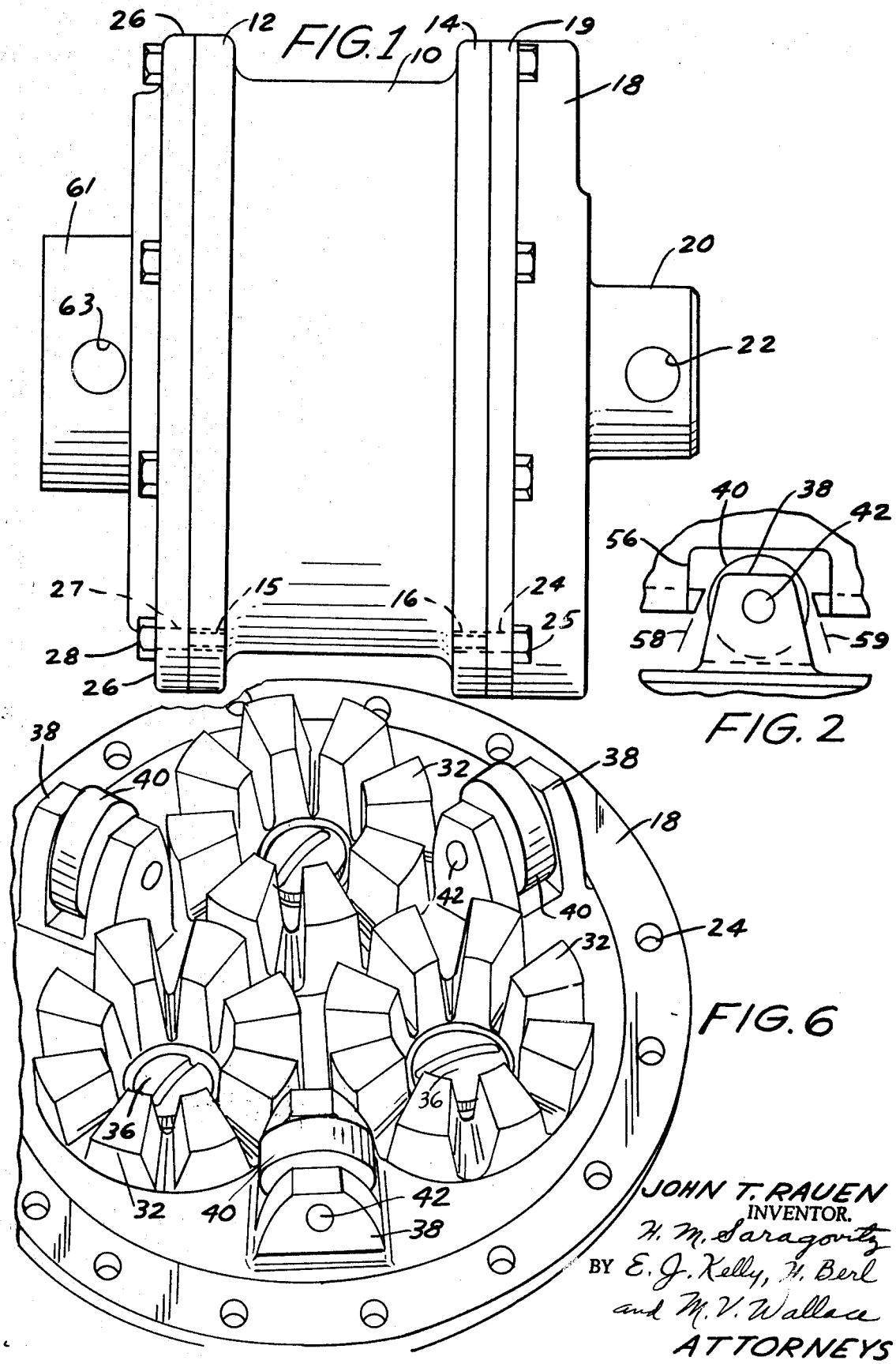
JOHN T. RAUEN
INVENTOR.
BY H. M. Saragovitz
E. J. Kelly, H. Berl
and M. V. Wallace
ATTORNEYS Patented Oct. 20, 1970

JOHN T. RAUEN
INVENTOR

BY H. M. Saragovitz
E. J. Kelly, H. Berl
and M. V. Wallace

ATTORNEYS

TORQUE LIMITING DEVICE

This application is a continuation of application Ser. No. 651,105 filed June 30, 1967 which is now abandoned.

The present invention relates to a torque limiting device and more particularly to a new and unique power release device for limiting the amount of torque that can be transmitted by a given capacity drive shaft.

In the past many types of torque limiting devices have been introduced in the field and within applicant's knowledge most of them have been complicated, expensive, heavy, complex—release within wide limits of variations from a predetermined amount and operate mechanohydraulically, mechanoelectrically, or entirely mechanically. The simplest type is the solely mechanical shearpin form involving a pin member which is sheared by torque overload. These pins have several undesirable features such as being difficult to remove following shearing whether or not of the proper hardness, ability to install pins of improper strength and/or under size. Need for adequate accessability to remove sheared pins and install new ones. Inability to release within small limits of the intended amount even with proper pins. The need of having a supply of pins available when failure occurs and the inability to readily determine that a given pin is the correct one —not too hard or too soft. Even though the pin can be marked to identify it, the markings have been known to be wrong.

Applicant's device prevents overload damage to a power train due to an uncontrollably suddenly applied excess load, such as occurs with winches installed upon vehicles to enable them to pull themselves and/or other vehicles out of roadside ditches or other difficulties encountered along rough roads or open country travel. The winches have an extendable and retractable steel cable. When the cable is extended and attached to an object to be moved, particularly along rough terrain, then upon retracting the cable to move the object, the object may suddenly encounter excessive resistance to being moved and therefore too quickly for an operator to stop the moving action. The suddenly encountered resistance could damage the object, the winch and/or break the cable if power input to the winch were not equally as suddenly released, hence the need for a torque or power limiter.

The principal object of the present invention is to provide a new and improved torque limiting device that is relatively simple of operation and construction, relatively cheap to manufacture and provides a superior device for prevention of power train damage.

Another object of the invention is to provide a new and improved torque limiting device incorporating liquid means for cushioning the internal working parts of the device against the operationally damaging shock producing forces developed within the device, upon release of the driven members of the device.

A further object of the invention is to provide a new and improved torque release mechanism wherein magnets particularly are used and in combination with antifriction bearings in the release mechanism to enable an extremely small movement and thereby a substantially instantaneous lessening of transmitted torque when the predetermined release load is reached, whereby friction associated with movement of any mechanism becomes minimized and whereby release consistantly occurs within extremely small load limits of a predetermined amount and regardless of whether or not the torque is applied in the direction of clockwise or counterclockwise rotation.

Another object of the invention is to provide a torque limiter which completely disengages the drive each time that the predetermined torque is exceeded and remains completely disengaged until it is remotely or directly manually reengaged. If a torque limiting device is not made to remain completely released, then it tries to reengage immediately following disengagement with the resulting effect of impulses or jerks known as "chattering" in the transmission of torque. Such chattering produces shock and its highly overloading forces which entail an undesirable, much larger (stronger) and heavier entire power train in order to withstand such forces without damaging effects.

The above and other objects of the invention will appear more fully from the following more detailed description and from the drawings, wherein:

FIG. 1 is an exterior view of the torque limiting device;

FIG. 2 is a fragmentary view taken substantially along line 2–2 of FIG. 3 showing one of three identical rollers and their engaging cams;

FIG. 6 is a perspective view taken substantially along line 6–6 of FIG. 3.

Figure 3:
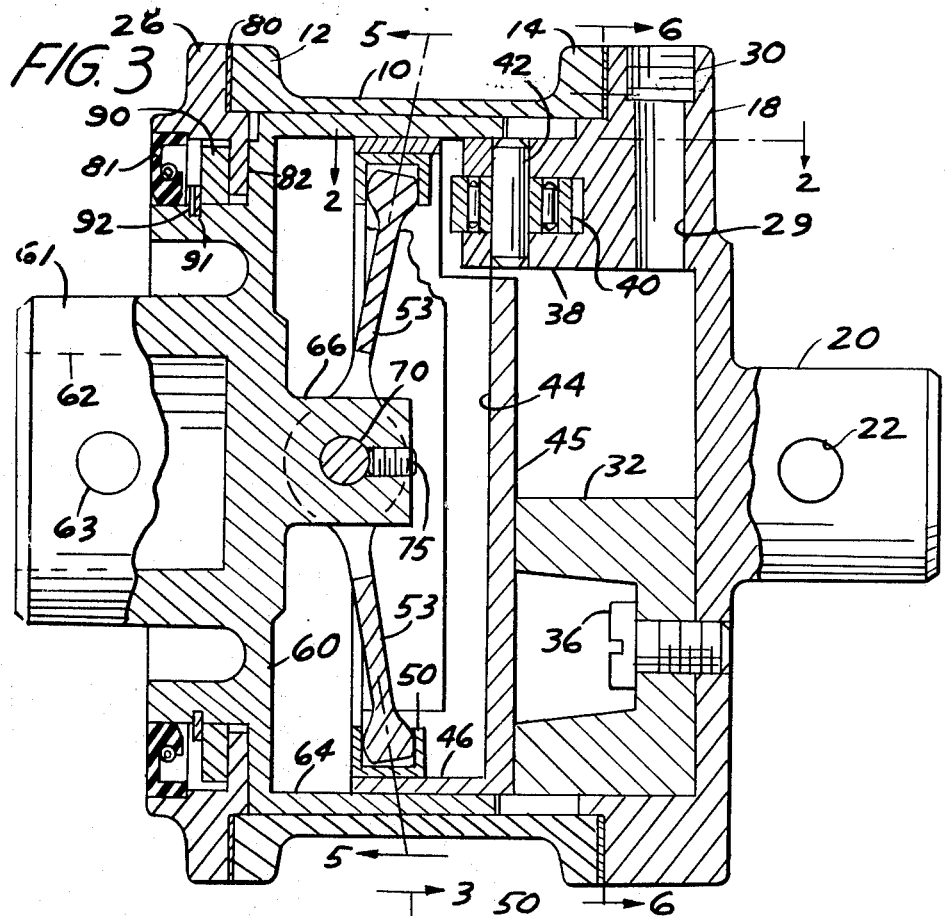
FIG. 3 is a partial sectional view taken substantially along line 3–3 of FIG. 5.

Referring now to the drawings in detail wherein like reference characters designate like or corresponding parts throughout the several views, the numeral 10, FIGS. 1 and 3, designates the cylindrically shaped main body having formed integrally thereon a pair of opposed circumferential flange members 12, 14, said flange 12 having formed therein screw-threaded holes 15, flange 14 and screw-threaded holes 16. The device can be driven from either end; however for explanatory purposes, numeral 18 identifies the driving end member having a flange 19, FIG. 1, formed integrally thereon and an integral spindle 20 having formed horizontally therethrough an opening 22 adapted to receive a driving pin, not shown, for coupling to a drive shaft, not shown. Flange 19, of end member 18, has formed therein a plurality of openings 24 to be aligned with openings 16 in flange 14, to receive screws 25, while a ring-shaped retaining member 26 has openings 27 therein to be aligned with screw-threaded openings 15 in flange 12 to receive screws 28, to secure the driving and driven ends of the assembly in closed relationship with body 10.

An oil passageway 29 is provided in member 18 to allow the device to be substantially filled with oil. A pipe threaded plug member 30 is provided to close and seal passageway 29. The inner portion of end member 18 is provided with three equally spaced, in a circle, segmental permanent magnets 32, FIGS. 3 and 6, secured to the member 18 by means of brass screws 36, or the like. Three pairs of spaced apart opposed bosses 38, FIGS. 2, 3 and 6, are provided integrally with the member 18 and interposed among the three magnets 32, FIG. 6, to form a three point suspension for a piston member later described. The bosses 38 are adapted to rotatably receive three roller bearings 40, FIGS. 2 and 6, with their periphery raised above the faces of the magnets and supported upon shaft 42. The bosses 38 are provided with holes of such diameter as to necessitate forcing shafts 42 into them and whereby they are retained therein. A piston 44, is provided comprising a head 45 and an integral cylindrically shaped skirt 46. Into the skirt 46 is securely forced an incomplete circular shaped section 48 of a ring including an integral substantially circular portion 49. At two locations, spaced 180° apart, are formed two stirrups 50, FIGS. 3 and 5, integral with said portion 49. In line with stirrups 50, and straddling same, are four bosses 52, FIG. 5, the same being formed integrally with the piston skirt 46. The stirrups 50 and bosses 52 are adapted to detachably receive lever members 53, to be later described.

The piston head 45 at three equally spaced locations corresponding to the location of roller bearing bosses 38, FIGS. 3 and 6, of drive end member 18 is provided with three identical openings 56, FIG. 2. These openings 56 are adapted to admit the three rollers 40 and a portion of bosses 38. The side extremity of each opening is tapered, as at 58, 59, to provide cams. The rollers 40 roll upon either of the cams 58, 59, depending upon clockwise or counterclockwise rotation of the driving end 18, when forcing the piston head 45 off of magnets 32 at the instance of overload release. At less than overload torque the rollers 40 and cams 58 or 59 drive the driven end member 60.

Figure 5:
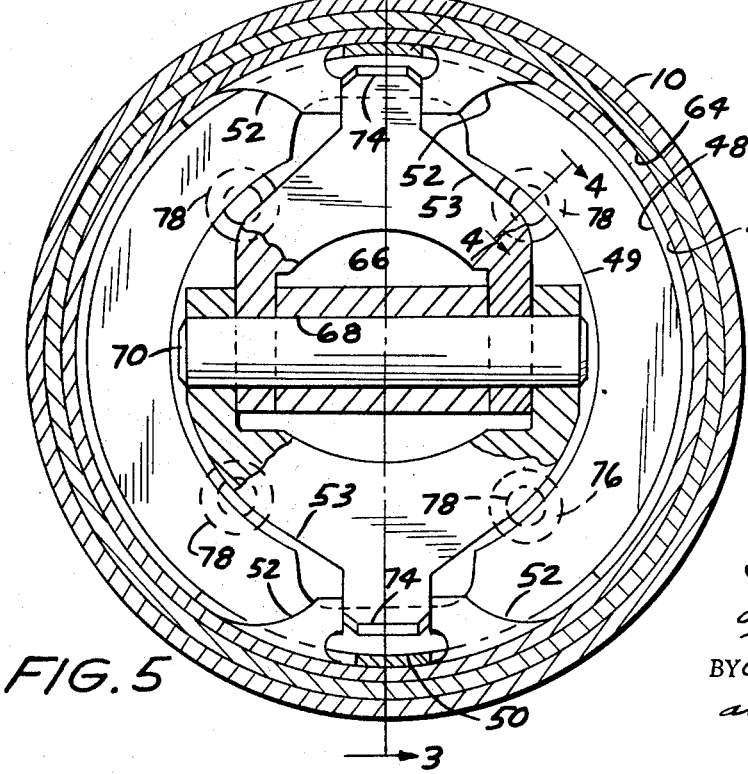
FIG. 5 is a sectional view taken substantially along line 5–5 of FIG. 3.

The driven side of the device comprises the ring-shaped retaining member 26, FIGS. 1 and 3. Rotatably mounted within member 26 is a driven end assembly comprising the end member 60, FIG. 3, having an external boss 61 and a hole 63 to receive a pin for driving and for coupling onto a driven shaft, not shown. The member 60 also includes an integral cylindrical skirt 64 and an integral interior boss 66 having an opening 68, FIG. 5, to receive pin 70 upon which is pivotally mounted the pair of opposed fork-shaped driven levers 53; the same being formed to provide knob-shaped portions 74 thereon adapted to detachably snuggle and rotatably fit into stirrups 50 and bosses 52 of piston 44, as shown in FIGS. 3 and 5. The pin 70 is retained in its assembled position, FIG. 5, by screw 75, FIG. 3, threaded into boss 66 and impinging upon pin 70. The driven member 60 also has formed therein four openings 76, FIG. 4, the same being adapted to slidably receive four pin members 78, FIGS. 4 and 5, the same having conventional O-rings 79 mounted thereon to form oil seals. The openings 76 are located so that they engage driven levers 53, FIG. 5, at the time of reengaging the drive.

A gasket 80 and oil seal 81 are provided to prevent oil leakage between the driven end member 60 and retaining member 26, FIG. 3, and body member 10. The retaining member 26 is provided with a portion 82 disposed between the driven end member 60 and a ring member 90 for rotatably retaining the end member 60 against axially outward movement. A snap ring 91 seated in groove 92 formed in end member 60 secures the ring 90 in axial position upon end member 60 to prevent inward movement of end member 60 beyond a predetermined small amount.

The manner in which the device is assembled and operates is as follows:

Referring to FIG. 3, the driving end plate member 18 is inserted into one of the open ends of body member 10 and the screw holes 24 in flange 19, of end 18, FIG. 1 are aligned with the screw holes 16 in flange 14 of body 10 and the two parts are secured together by means of screws 25. Piston 44 is then placed in the open end of skirt 64, of driven end assembly member 60; while simultaneously aligning the knob ends 74 of the levers 53 with the stirrups 50 of ring portion 49 then rotating the levers 53 towards each other to allow the knob ends 74 to get under and into the stirrups 50 between the bosses 50, FIG. 5. At this point of the assembly the piston 44 will freely enter the skirt 64 to the position of piston 44 shown in FIG. 3. While completing the entrance of piston 44 into the skirt 64, the knobs 74 and levers 53, move radially outward and fully into the stirrups 50 as the levers 53 rotate away from each other to the position shown in FIG. 3. The retaining member 26, ring members 90 and 92 and oil seal 81 are then assembled in that order upon the member 60. The subassembly so made is then placed into the remaining open end of body 10 and moved inwardly of body 10 to the position shown in FIG. 3. Screw holes 15, in flange 12, are aligned with screw holes 27 in the retaining member 26 and the two sections are secured together applying screws 28. After filling with oil, as previously explained, the device is ready to use.

As explained, the purpose of the device is to limit the amount of torque that can be transmitted by a given capacity power train. It is a safety device preventing structural damage to a power train due to encountering an excessive torque load so suddenly applied as to be impossible to stop the machinery before same is damaged, or before damage is done to the object being moved. The device can be installed in any type of power train. It is built to drive and prevent structural damage to any part of the train when the torsion resistance of the driven shaft exceeds a specific limit regardless of the speed of overload occurance.

When installed in a power train and excessive resistance to motion is encountered, torque increases and an overload is created. When this occurs the connection between the drive and driven shaft becomes disconnected and then the driven part of the torque limiter becomes stopped by the excessive load and the driving part of the torque limiter continues to rotate freely until the driving machinery can be stopped.

With all members of the torque limiter positioned in relation to each other as shown in FIG. 3, the driving end 18 will rotate the driven end 60. The driving effort is transmitted by rollers 40 to the cams 58 or 59 depending upon the direction of rotation of the driving end 18. The cams 58 and 59, being integral with the piston head 45, and the piston head 45, piston skirt 46 and the piston skirt bosses 50, all being integral parts of the piston 44, rotary motion is transmitted to the ends 74 of the levers 53, nested within the bosses 50 of the piston 44, and then through the levers 53, rotary motion becomes finally transmitted to the driven end member 60.

During the above described rotary action, the rollers 40, acting upon the cams 58, for one specific direction of rotation, produce a component force tending to unseat the piston 44 from the magnets 32. When the predetermined limit of torque transmission is reached, the rollers 40 unseat the piston 44 and move it fully to the left of the position shown in FIG. 3, as the rollers 40 roll up the cam 58 and out of the opening 56, FIG. 2, and upon the face of piston head 45, whereupon all torque transmission ceases. The driving end 18 then becomes free to rotate without transmitting torque to the driven end 60. The piston 44 is slidably piloted in the skirt 64 of the member 60. The sliding fit of the piston 44 provides sufficient diametral clearance within the skirt 64 to allow the piston 44 to shift radially sufficiently to compensate for the unavoidable minute manufacturing inaccuracies in circular spacing of the rollers 40 and their cams 58 and 59, and to compensate for the concentricity in accuracy relative to the axis of rotation of the circular pitch (spacing) diameter of the rollers 40 and the circular pitch diameter of the cams 58 and 59 at the diameter that the rollers 40 contact with the cams 58 and 59 whereby the three rollers 40 can engage the three cams 58 or 59, in such manner as to distribute the torque load equally between each roller and its contacted cam. In this arrangement the piston 44 becomes piloted within the skirt 64, by the rollers 40 and without contact with the skirt 64. Therefore, at the instant of releasing the drive, sliding friction of the piston 44 does not occur. Sliding friction can vary considerably the amount of effort required to overcome it, whereby movement of the part so affected can commence. Such friction, were it allowed to occur in this device, would significantly vary the predetermined release torque value which this device is intended to and does provide within very narrow limits heretofore unattainable. Wide variation in release torque from a specific value, necessitates stronger than necessary power train construction. It also makes it possible to damage the item being moved or driven, should it encounter an impasse.

When cams alone are used in engagement with each other, and held in contact by the force of a spring or other yieldable source of force providing a yieldable connection between the driving and driven members including the likes of piston 44 and magnets 32, the cams must slide over each other to the point where their apexes can pass each other before release can occur. The sliding action has friction associated with it even though the surfaces are adequately lubricated. It is well known in the mechanical art that even the friction of lubricated surfaces can and does vary widely depending on the presence of a quantity of parameters causing the variation. Therefore a torque limiting device which does not release substantially instantaneously, i.e. with substantially zero mechanical movement; and then, the friction of even such small movement made to be substantially constant as by rolling rather than sliding surfaces, such device becomes inadequate.

The roller bearings 40 also provide a further minimization of movement friction, but more particularly they keep that friction within significantly narrow limits of a specific low value on all occasions. Therefore, the combination of substantially zero sliding friction on the part of piston 44, plus the substantially constant value of roller bearing 40 friction, plus substantially instantaneous (magnet) force release, provides a unique torque limiting device of significant improvement in the art of releasing torque overload.

When the piston 44 is forced off of the magnets 32 during torque release, it is moved away from the magnetic field provided by the magnets to a point where the rollers 40 clear the piston head 45. At this distance the magnets will not attract the piston 44 towards reengagement. Therefore, the piston 44 remains completely disengaged and the drive runs free of any chatter caused by attempts to reestablish the drive as occurs in release mechanisms of certain prior art. Such "chatter" produces repetitive suddenly occurring loads which because of their sudden occurrence become much greater torque loads; consequently the release device and the entire power train must be made of stronger and therefore heavier and more expensive construction to become undamaged during such mechanical behavior.

During release action the piston 44 would be moved with very high velocity into a sudden stop against the driven member 60 and with detrimental effect, the least of which is noise, were it not that the interior of the torque limiter is substantially filled with lubricating oil of a suitable commercial type. During the above described action, the oil in the area to left of the piston head 45, as seen in FIG. 3, becomes displaced to the right of the piston head 45. The oil flows through the opening 56, FIG. 2, in the piston head 45, previously described. The force required to displace the oil in the manner just desribed reduces the velocity of movement of the piston 44 so that it strikes the driven member 60 with tolerable impact velocity.

Figure 4:
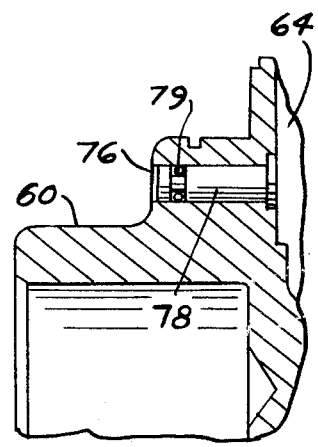
FIG. 4 is a fragmentary view taken substantially along line 4–4 of FIG. 5, showing the reset pins.

During movement of piston 44, in either the direction of release or restoration of drive, the stirrups 52, FIG. 3, rotate the levers 53 on their fulcrum pin 70. To restore piston 44 to its seat upon magnets 32, the pins 78, FIGS. 4 and 5, are pushed inwardly of the position shown in FIG. 4, using a poker that will enter the pin hole 76. These pins 78 contact the levers 53, as shown in FIG. 5. The levers 53 move the piston 44. The pins 78 remain inward of the position shown in FIG. 4, until releasing action again occurs.

During restoration of the drive as described immediately above, the driven end 60, containing the restoring pins 78, is held stationary in order to allow the pins 78 to be moved inwardly. The driven end 18 is rotated slowly while pushing on pins 78, then, when the rollers 40 come into alignment with the openings 56 in the piston head 45, the piston can be moved towards and into reengagement with magnets 32. When the piston 44 has reached about one-half of the distance towards reengagement, it comes sufficiently within the magnetic field of the magnets 32 to be drawn the remaining distance of reengagement.

While the piston 44 is seated upon the magnets 32 the piston is held there with the greatest force. The instant that contact of the piston 44 is broken with the magnets 32, the force to move the piston drops off very fast and nonproportionally to increase of the separating distance. Therefore, torque release occurs substantially instantaneously the instant that the piston 44 breaks contact with magnets 32. This is so because thereafter total disengagement of the drive follows through to completion and occurs also substantially instantaneously. This is a novel characteristic in the art of torque limiters. Furthermore, the magnets 32 provide a substantially unvarying amount of force which contributes to the ability of this device to consistently release at substantially the same point of torque transmission.

There has been disclosed herein a new and improved device to limit the amount of torque that can be transmitted by a given capacity drive shaft or power transmitting train. The device also provides a safety feature preventing torque damage to a power train due to an uncontrollable excess load where the object to be moved may suddenly offer resistance to being moved and where the sudden resistance could damage the object to be moved.

It is thought that the invention and many of its attendant advantages will be understood from the foregoing description, and it will be apparent that various changes may be made in the form, construction and arrangement of the parts without departing from the spirit and scope of the invention or sacrificing any of the material advantages; the form hereinbefore described being merely a preferred embodiment thereof.

I claim:

1. A torque limiting device including:
a drive means and a positive driven means;
said driven means including a positive driven armature means and a substantially cup-shaped member;
said armature means and said cup-shaped member being interconnected by connecting means;
said drive means including a liquid containing housing;
a plate member having mounted thereon magnetic means;
a roller means mounted on said plate member;
said armature means having cams formed therein engaging said roller means and normally engaging said magnetic means;
said cylindrical cup-shaped member having mounted therein said connecting means adapted to movably engage with said armature means adapted to radially slide and move angularly within said cup-shaped member so that when said drive means is rotated clockwise or counterclockwise rotary movement is imparted through said armature means and said connecting means to said cup-shaped member;
said connecting means including a plurality of torque transmitting levers; and
openings in said cup-shaped member having slidably mounted therein reset pins adapted to contact said connecting means to return said armature to contact with said magnets following torque transmission interruption.

2. A torque limiting device comprising:
drive means and a positive driven means, said driven means including a positive driven armature means and a substantially cup-shaped member;
said armature means and said cup-shaped member being interconnected by connecting means;
said armature means being adapted to contact continuously energized magnet means at all times prior to being separated from said magnet means by a predetermined torque overload;
said drive means including said magnet means and producing a predetermined maximum attractive force upon said armature means when said armature contacts said magnet means;
said armature means being adapted to be forced out of range of attraction of said magnet means at an instant of occurrence of said predetermined torque overload, and unaidedly remaining out of said range until a predetermined controlled effort is applied to return said armature into said range;
Said armature and said magnet when separated during said torque overload separation remaining inherently so separated;
said armature offering negligible resistance to reengagement by said predetermined controlled force applied to reengaging means adapted to reengage said armature and said magnet following said separation;
said driving means substantially encloses said driven means and is adapted to be leakproof, filled with a predetermined type fluid;
said drive means including a drive shaft and a cylindrical portion larger in diameter than said drive shaft;
said driven means including a drive shaft and a cylindrical portion larger in diameter than said driven shaft;
said drive means cylindrical portion being adapted to rotatably receive said driven means cylindrical portion and to axially retain in place said last mentioned means;
said driven means cylindrical portion being adapted to axially slidably receive said armature means;
said drive means cylindrical portion and said driven means cylindrical portion as assembled in said torque limiter forming a cavity in which said armature axially moves during disengagement and reengagement of torque transmission, said fluid filling said cavity;

wherein said driven means is adapted to displace said predetermined type fluid within said cavity from one side of said armature to the opposite side of same during said separation of said armature from said magnet; and wherein said armature is provided with fluid passage means allowing said fluid to move through said armature during said separation.

3. A torque limiter as set forth in claim 2, wherein said passage means is adapted to restrict the free flow of said predetermined type fluid from said one side to the opposite of said armature particularly during said separation, whereby said armature speed of axial movement upon said separation is limited to a predetermined rate of separating speed.

4. A torque limiter as set forth in claim 2, wherein, said passage means are of such predetermined size to be a predetermined impediment to the flow of said predetermined type fluid from one side to the opposite side of said armature as said fluid temperature varies within said torque limiter as a result of said torque limiter ambient temperature.